(12) United States Patent
Marmor (10) Patent No.: US 11,838,447 B2
(45) Date of Patent: Dec. 5, 2023

(54) SYSTEMS AND METHODS FOR COORDINATING AN IMPROMPTU VOICE MEETING IN AN AUTOMATED CALL DISTRIBUTION SYSTEM

(71) Applicant: InContact Inc., Salt Lake City, UT (US)

(72) Inventor: Alex Marmor, South Jordan, UT (US)

(73) Assignee: InContact Inc., Salt Lake City, UT (US)

( * ) Notice: Subject to any disclaimer, the term of this patent is extended or adjusted under 35 U.S.C. 154(b) by 135 days.

(21) Appl. No.: 17/470,198

(22) Filed: Sep. 9, 2021

(65) Prior Publication Data
US 2023/0069936 A1 Mar. 9, 2023

(51) Int. Cl.
*H04M 3/56* (2006.01)
*H04M 3/523* (2006.01)

(52) U.S. Cl.
CPC ............ *H04M 3/56* (2013.01); *H04M 3/523* (2013.01)

(58) Field of Classification Search
None
See application file for complete search history.

(56) References Cited

U.S. PATENT DOCUMENTS

| | | | | |
|---|---|---|---|---|
| 11,528,365 | B1* | 12/2022 | Krimstock | H04M 3/5232 |
| 2007/0288562 | A1* | 12/2007 | Shaffer | H04M 3/563 |
| | | | | 709/204 |
| 2008/0165944 | A1* | 7/2008 | Rosenthal | H04M 3/56 |
| | | | | 379/202.01 |
| 2018/0103073 | A1* | 4/2018 | Rosenberg | H04L 61/4555 |

OTHER PUBLICATIONS https://www.microsoft.com/en-us/microsoft-teams/microsoft-teams-phone, printed on Dec. 27, 2021.
https://www.micro-soft.com/en-us/microsoft-teams/group-chat-software, printed on Dec. 27, 2021.

* cited by examiner

*Primary Examiner* — Harry S Hong
(74) *Attorney, Agent, or Firm* — PEARL COHEN ZEDEK LATZER BARATZ LLP (57) ABSTRACT

Systems and methods for coordinating an impromptu voice meeting in an automated call distribution (ACD) system receive a request to initiate the impromptu voice meeting among a team of agent devices; validate the request to initiate the impromptu voice meeting; generate a meeting contact identifier; commence the impromptu voice meeting between an initiator of the request and each of the available agent devices; link a respective state of the initiator of the request and each available agent device among the team of agent devices, to the meeting contact identifier; set a respective state of each unavailable agent device among the team of agent devices to a next state of the meeting contact identifier; and while the impromptu voice meeting is active, adding, by the processor, each respective previously unavailable device to the impromptu voice meeting as it becomes available.

21 Claims, 12 Drawing Sheets

| Name | ▲ # of Agents | Working | Unavailable | Available |
|---|---|---|---|---|
| Default Team<br>▲ 31 total agents | 0 | 0 | 0 | 0 |
| Team3<br>▲ 0 total agents | 0 | 0 | 0 | 0 |
| TEST<br>▲ 2 total agents | 2 | 0 | 1 | 1 |

| Type | Name | ▲ Time in State | Team | Skill | Contact ID | |
|---|---|---|---|---|---|---|
| | Dale Cheya | 28:43 | TEST | | ▭▭▭▭▭▭ | ▢ |
| | Alex Marmor | 00:28 | TEST | | | ▣ |

SYSTEMS AND METHODS FOR COORDINATING AN IMPROMPTU VOICE MEETING IN AN AUTOMATED CALL DISTRIBUTION SYSTEM

FIELD OF THE INVENTION

The present invention relates generally to coordinating voice meetings, e.g., among agents in a call-center. More specifically, the present invention relates systems and methods for coordinating an impromptu voice meeting in an automated call distribution (ACD) system.

BACKGROUND

Workplaces such as contact centers may employ many agents, supervisors, workers, and other employees which many need to communicate with one another. Furthermore, supervisors of contact center agents working remotely (e.g., agents working from home or in remote locations) need the ability to hold impromptu voice meetings with agents they supervise while those agents are actively taking calls from customers or clients.

In existing systems, a supervisor schedules a meeting and has agents manually make themselves unavailable to callers when the meeting is set to take place. A supervisor may manually conference into a call every agent as they become available. A supervisor may also use a third-party application to communicate with the agents without regard for their availability in the ACD (e.g., sending an e-mail or instant message asking agents to join a call).

However, presently available systems to do not provide a supervisor the ability to hold impromptu voice meetings with agents as they are actively taking calls from customers or clients in an ACD system.

SUMMARY

Embodiments of the invention provide methods for coordinating an impromptu voice meeting in an automated call distribution (ACD) system. In some embodiments, the invention may include receiving, by a processor, a request to initiate the impromptu voice meeting among a team of agent devices; validating, by the processor, the request to initiate the impromptu voice meeting; generating, by the processor, a meeting contact identifier; commencing, by the processor, the impromptu voice meeting between an initiator of the request and each of the available agent devices; linking, by the processor, a respective state of the initiator of the request and each available agent device among the team of agent devices, to the meeting contact identifier; setting by the processor, a respective state of each unavailable agent device among the team of agent devices to a next state of the meeting contact identifier; and while the impromptu voice meeting is active, adding, by the processor, each respective previously unavailable device to the impromptu voice meeting as it becomes available.

In some embodiments, the request may be sent based on an interaction with a user interface of a supervisor device initiating the request. In some embodiments the request may include a security token and a team identifier.

In some embodiments, validating the request may include authenticating, by the processor, the security token of the requestor; confirming, by the processor, that the requestor has sufficient permission to initiate the impromptu voice meeting; and verifying, by the processor, that the team identifier exists and is active.

In some embodiments, commencing the impromptu voice meeting may include invoking, by the processor, a call from a media provider to the initiator of the request and to each of the available agent devices.

Further embodiments of the invention may include activating, by the processor, a flag identifier for each team member upon validation of the request, wherein the flag identifier indicates that a meeting has been initiated; and deactivating, by the processor, the flag identifier for all team members when the meeting has been terminated.

In some embodiments, adding, by the processor, each respective unavailable device to the impromptu voice meeting as it becomes available may include invoking, by the processor, a call from the media provider to each respective previously unavailable device as it becomes available; and linking, by the processor, a respective state of each respective previously unavailable device to the meeting contact identifier.

Systems according to embodiments of the above methods may be provided. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention provide supervisors with a mechanism to commence a voice meeting with available Agents and place those agents who are presently unavailable in a state that will have them join the meeting as they become available. In particular, embodiments of the invention leverage the ACD system and an agent's state to simplify and coordinate channeling Agents into a conference call. Unlike, prior art solutions, which require a manual step for the agent which takes control out of the supervisor's hands, embodiments of the invention may force agents to take the call automatically as it is delivered by the ACD system to them. This further provides the ability for supervisors to reach their agents as a group in an impromptu manner, providing a significant improvement to remote workforce management systems.

Although described in the context of a contact center, the same or a similar system may be employed in other contexts where one person in a group desires to communicate with multiple members of the group that are using an ACD system. For example, embodiments of the systems and methods described herein may be employed at schools, non-profit organizations, or the like.

Figure 1:
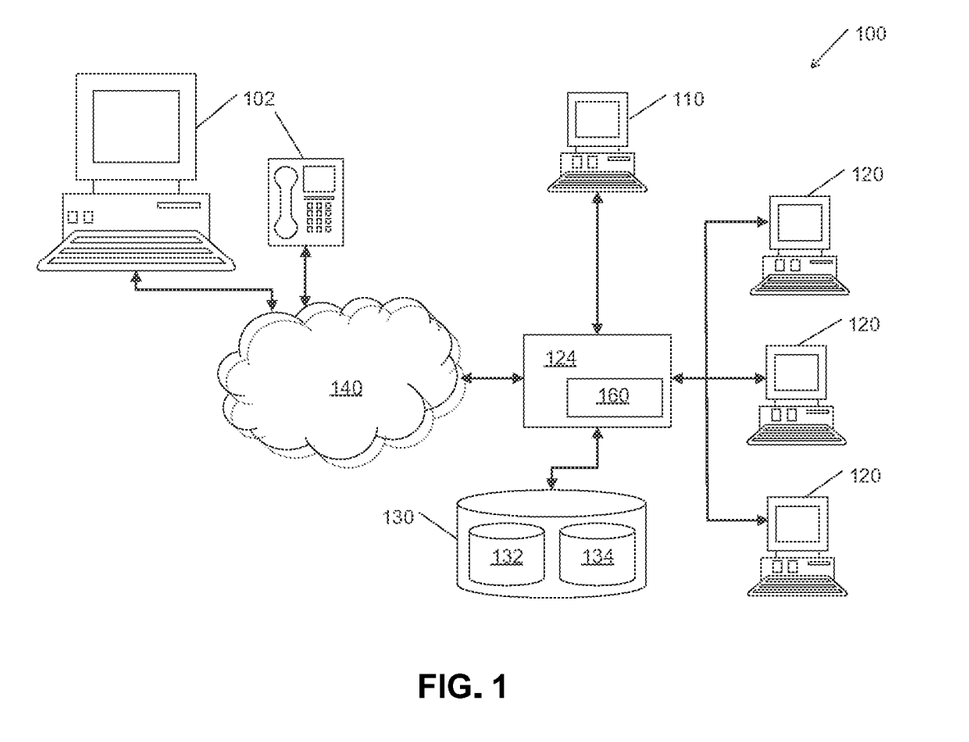
FIG. 1 schematically illustrates a system, according to embodiments of the invention.

Reference is made to FIG. 1, which schematically illustrates a system 100, according to embodiments of the invention. System 100 may include Automated Call Distribution system (referred to herein as "Automated Call Distributor" or "ACD") 124 which may connect customer devices 102 to agent devices 120 (also referred to herein as user devices). As understood herein, an Automated Call Distributor or Distribution System may refer to telephony hardware and/or software that automatically receives incoming calls and distributes them to an available agent. An ACD manages how calls are delivered to agent devices in the system. Generally, its purpose is to help inbound contact centers sort and manage large volumes of calls, e.g., to avoid overwhelming the team. ACD 124 may also be connected to supervisor device 110. As understood herein, an agent is a user of the ACD system who regularly takes phone calls from external callers of the system. A contact center of FIG. 1 may be or may include company call centers for telephone-based support, or online support forums for voice over internet protocol (VoIP) Internet-based support, for example, to provide customers with technical support, sell products, schedule appointments, or otherwise interact or communicate with customers. Organizations other than a contact center may use embodiments of the invention and/or other configurations as generally understood in the art. The contact center of FIG. 1 may include a switching station to connect each of a plurality of user devices 102 to one of a plurality of agent devices 120 at the same time. ACD 124 may include voice meeting engine 160 configured to enable coordinating an impromptu voice meeting, e.g., for supervisor device 110 and a plurality of agent devices 120, in an automated call distribution system, as described herein, to implement various embodiments of the invention. ACD 124 may be connected to one or more databases 130 for storing interactions or calls (e.g., conversations via telephone, VoIP, etc.) between users and agents via user devices 102 and agent's devices 120, and other data such as agents' attributes, performance improvement grades of workers, training programs, costs of training programs, and any other relevant data.

In some embodiments one or more databases 130 may include, for example a worker profile database or worker database 132 and an agent status database 134. Worker database 132 may store attributes of workers. The worker attributes may be used for, among other things, finding a group of similar or otherwise associated workers given a specific worker (e.g., all agents on a specific team or associated in some way). The attributes may include any characteristic of or describing the workers that may be used for categorizing or clustering workers and finding similar workers. The attributes may include for example, an agent's soft skills, relevant contact center statistics and an agent's attributes. For example, agent's soft skills may include ranks or grades for the agent's communication skills, problem solving, professionalism, creativity, etc., the agent attributes may include tenure, fields of expertise, languages, education, age, etc., and contact center statistics may include working shifts, average handle time, average call sentiment, transfer rate etc. Other attributes may be used. Agent status database 134 may be configured to collect and/or store a status of each agent with respect to ACD 124 and voice meeting engine 160.

System 100 may be connected, or configured to be connected, to one or more user devices 102, such as, computers (for web or Internet voice connections), telephones (for telephone or radio network connections), for a customer to interact with and communicate with agents over one or more networks 140. Networks 140 may include any type of network or combination of networks available for supporting communication between user devices 102, supervisor device 110, the contact center of FIG. 1, ACD 124, agent devices 120 and databases 130. Networks 140 may include for example, wired and wireless telephone networks, the Internet and intranet networks, etc. Customers may use user devices 102 to connect to and communicate with live agents, for example, using or operating on agent devices 120 at the contact center of FIG. 1. System 100 may be connected, or configured to be connected, to one or more supervisor devices 102, such as, a computer for supervising agents Each of user devices 102, supervisor device 110, the contact center, ACD 124 and agent devices 120 may be or may include a computing device such as computing device 200 depicted in FIG. 2, having one or more processors for executing one or more code sets to implement various aspects of the invention. One or more database 130 may be or may include a storage device such as storage device 230.

Figure 2:
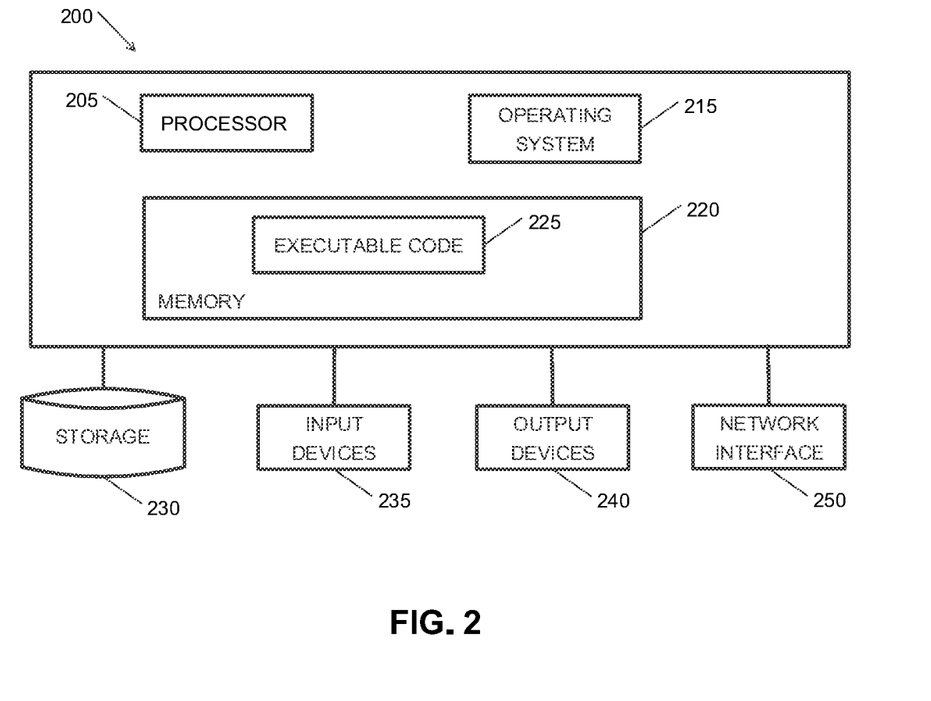
FIG. 2 illustrates an example computing device according to an embodiment of the invention.

FIG. 2 illustrates an example computing device according to an embodiment of the invention. Various components such as supervisor devices 110, agent devices 120, the contact center, ACD 124 and other modules, may be or include computing device 200, or may include components such as shown in FIG. 2. For example, a first computing device 200 with a first controller or processor 205 may be used to coordinate impromptu voice meetings in an automated call distribution (ACD) system, as described herein.

Computing device 200 may include a processor 205 that may be, for example, a central processing unit processor (CPU), a chip or any suitable computing or computational device, an operating system 215, a memory 220, a storage 230, input devices 235 and output devices 240. Processor 205 may be or include one or more processors, etc., co-located or distributed. Computing device 200 may be for example a workstation or personal computer located at a workplace or call center, or may be at least partially implemented by a remote server (e.g., in the "cloud").

Operating system 215 may be or may include any code segment designed and/or configured to perform tasks involving coordination, scheduling, arbitration, supervising, controlling or otherwise managing operation of computing device 200, for example. Operating system 215 may be a commercial operating system. Memory 220 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 220 may be or may include a plurality of possibly different memory units.

Executable code 225 may be any executable code, e.g., an application, a program, a process, task or script. Executable code 225 may be executed by processor 205 possibly under control of operating system 215. For example, executable code 225 may be or include an application to select a training program for a worker. In some embodiments, more than one computing device 200 may be used. For example, a plurality of computing devices that include components similar to those included in computing device 200 may be connected to a network and used as a system.

Storage 230 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 2 may be omitted. For example, memory 220 may be a non-volatile memory having the storage capacity of storage 230. Accordingly, although shown as a separate component, storage 230 may be embedded or included in memory 220.

Input devices 235 may be or may include a mouse, a keyboard, a touch screen or pad or any suitable input device. It will be recognized that any suitable number of input devices may be operatively connected to computing device 200 as shown by block 235. Output devices 240 may include one or more displays, speakers and/or any other suitable output devices. It will be recognized that any suitable number of output devices may be operatively connected to computing device 200 as shown by block 240. Any applicable input/output (I/O) devices may be connected to computing device 200 as shown by blocks 235 and 240. For example, a wired or wireless network interface card (NIC), a modem, printer or facsimile machine, a universal serial bus (USB) device or external hard drive may be included in input devices 235 and/or output devices 240. Network interface 250 may enable device 200 to communicate with one or more other computers or networks. For example, network interface 250 may include a WiFi or Bluetooth device or connection, a connection to an intranet or the internet, an antenna etc.

Figure 3:
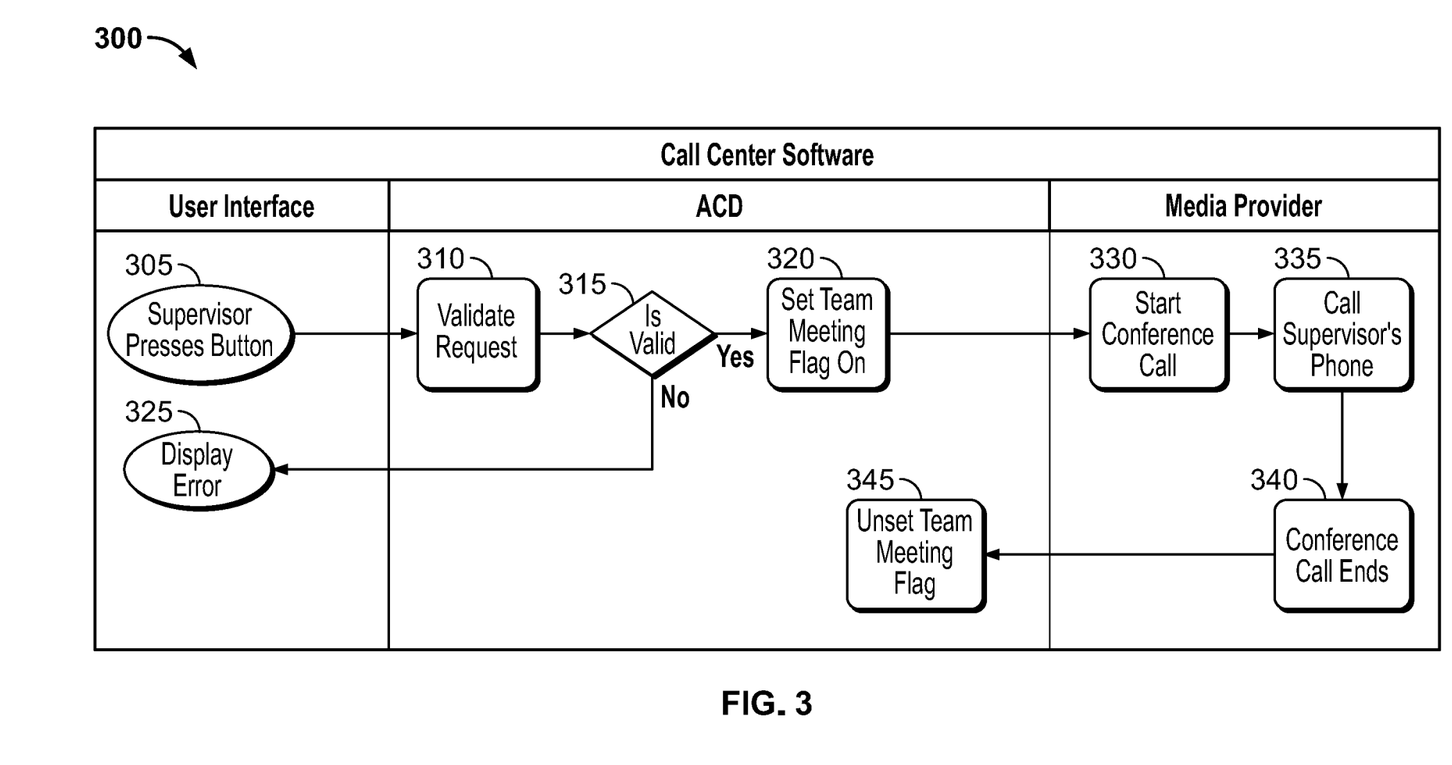
FIG. 3 is a flowchart of a method for coordinating an impromptu voice meeting in an automated call distribution (ACD) system, according to at least one embodiment of the invention.

Reference is made to FIG. 3, which is a flowchart of a method 300 for coordinating an impromptu voice meeting in an ACD system, according to embodiments of the invention. An embodiment of a method for coordinating an impromptu voice meeting in an ACD system may be performed, for example, by the systems shown in FIG. 1 and/or FIG. 2, but other hardware may be used. For example, method 200 may be performed on a computer (as described herein) having one or more processors, memory, and one or more codes set stored in the memory and executing in the processor, such as, voice meeting engine 160 and/or one or more other code modules, which, when executed, implement various embodiments of the invention as described herein.

Embodiments of the invention begin at step 305, when the processor is configured to receive a request to initiate the impromptu voice meeting among a team or group of user devices, e.g., agent devices 120. In some embodiments, a supervisor may start a meeting, e.g., by pressing or otherwise selecting a button on a user interface of supervisor device 110, which may cause supervisor device 110 to send a meeting request to voice meeting engine 160.

Figure 4:
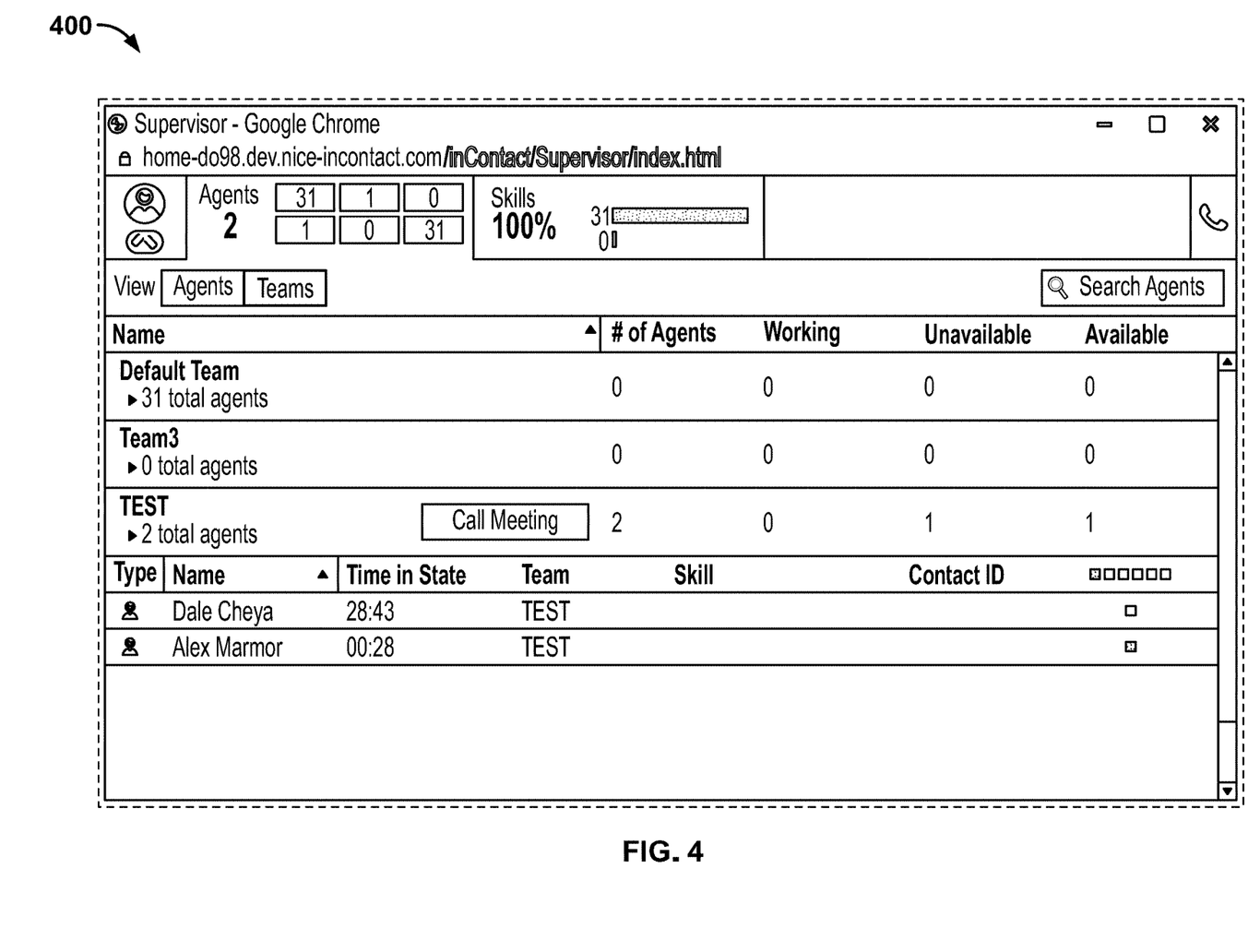
FIG. 4 depicts an example supervisor's user interface shown according to at least one embodiment of the invention.

Turning briefly to FIG. 4, an example supervisor's user interface 400 is shown according to at least one embodiment of the invention. A supervisor may navigate to an Agents tab to start a meeting. The Agents tab may, for example, list all the teams under a supervisor's supervision and/or current status information about various agents. For example, a supervisor may click on or otherwise select a team to view and expanded list showing all members of that team and the information about each agent. In some embodiments, a when a team is selected on the user interface, a "call meeting" button may appear in-line with that team's header. Further, in some embodiments, selection of the "call meeting" button by the supervisor may send the request to initiate the impromptu meeting with the agents of the selected team.

Returning to FIG. 3, at step 310, in some embodiments, the processor may be configured to validate the request to initiate the impromptu voice meeting. For example, in some embodiments, the ACD may attempt to validate credentials being used, in order to prevent unauthorized access. At step 315, if the request is validated then at step 320 the processor may be configured to set a team meeting indicator or flag to on. Alternatively, if at step 315, the request is invalidated (e.g., the credentials are not authorized), then at step 325, an error is returned to the requestor and the process ends.

Figure 5:
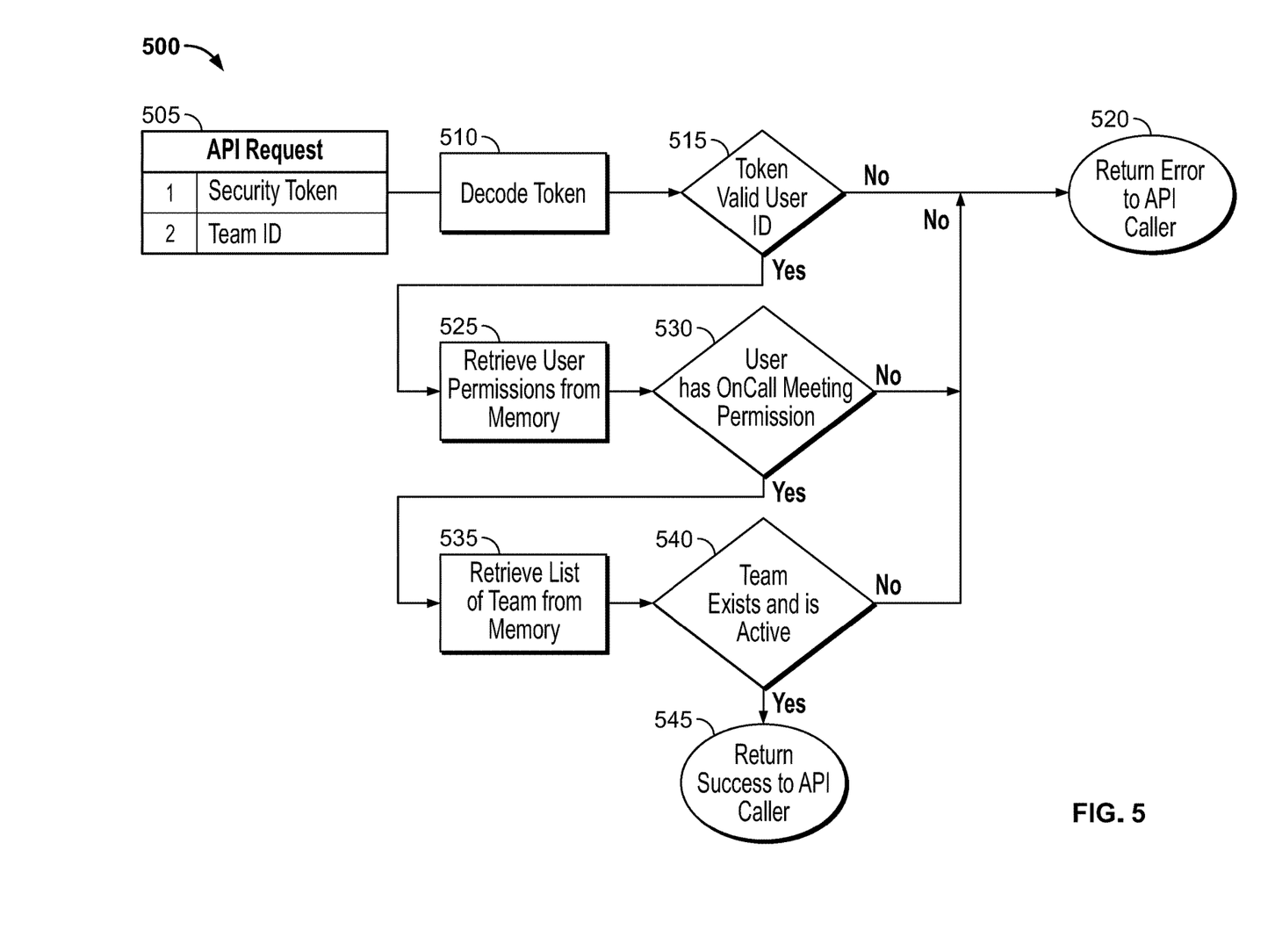
FIG. 5 is a flowchart of a method of validating a request to initiate the impromptu meeting according to at least one embodiment of the invention.

Turning briefly to FIG. 5, a flowchart of a method of validating a request to initiate the impromptu meeting is described according to embodiments of the invention. At step 505, an application programming interface (API) request may be received by the processor comprising at least a security token and a team identification (ID). At step 510, in some embodiments, the processor may be configured to decode the security token. At step 515, in some embodiments, if the token is invalid, then, at step 520, an error may be returned to the API caller and the validation ends. Alternatively, if, at step 515, the token is validated, then in some embodiments, at step 525, the processor may be configured to retrieve user permissions from memory. Next, at step 530, in some embodiments, the processor may determine whether the user (e.g., the supervisor) has on-call meeting permissions, i.e., permission to initiate an impromptu meeting with agents. If the user does not have the requisite permissions, then the method returns to step 520. Alternatively, if the user has the requisite permissions, then, in some embodiments, at step 535, the processor may be configured to retrieve the list of team members (i.e., agents) from memory, e.g., from database 130. Next, at step 540, if the requested team does not exist and or is active, then the method returns to step 520. Alternatively, if the requested team exists and is active, then, at step 545, a success indicator may be returned to the API caller and the request is validated, and the method ends.

Figure 6:
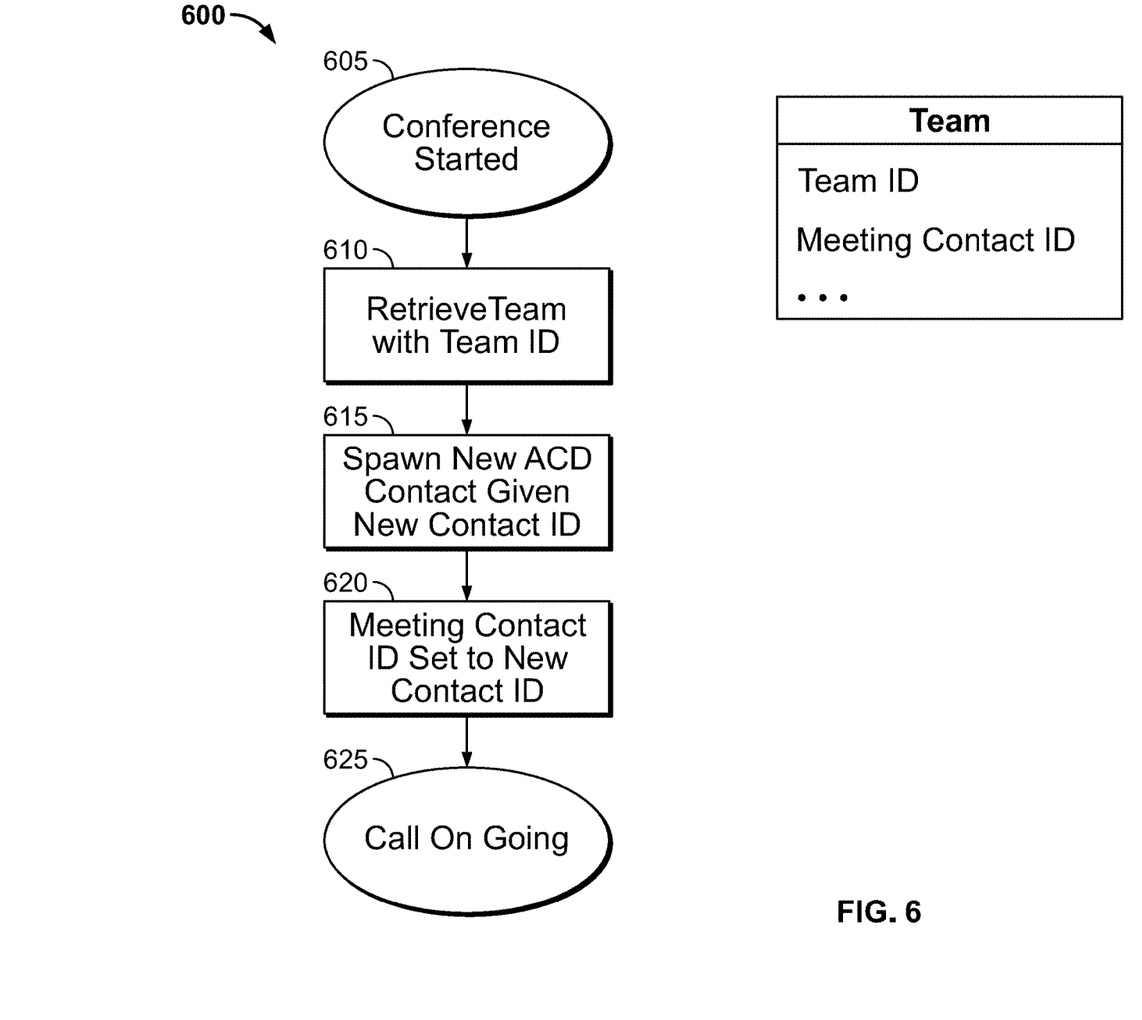
FIG. 6 depicts a second screenshot example shown according to at least one embodiment of the invention.

Turning briefly to FIG. 6, a flowchart of a method 600 of generating a conference is described according to embodiments of the invention. At step 605, in some embodiments, upon validating a supervisor's request to start an impromptu meeting, the processor may start a new meeting or conference within ACD system 124. Next, at step 610, in some embodiments, the processor may be configured to retrieve the requested team using, e.g., a team identifier (ID). The team ID may be associated with each member of a team such that each agent device 120 may be contacted. As understood herein, contact may refer to Any type of ongoing communication between the Agent and someone or something else. This includes phone calls and internet communications (e.g., chat, email, SMS, etc.) and could be from a person or other automated system. At step 615, the processor may be configured to spawn a new ACD contact in ACD system 124, and at step 620, a meeting contact identifier (ID) may be set to a new contact identifier (ID), which may be linked with each member of the team (e.g., using the team ID). Finally, in some embodiments, at step 625, the conference status may be updated to "On-going" or other indication that a conference call has begun.

Returning to FIG. 3, at step 330, in some embodiments, the processor may be configured to commence the impromptu voice meeting between an initiator of the request and each of the available agent devices. In some embodiments, initially, at step 335, the processor is configured to contact the supervisor (e.g., supervisor device 110) to ensure the supervisor is on the call. Of course, in other embodiments, the processor may be configured to connect one or a predefined plurality of agents (e.g., agent devices 120) prior to connecting the supervisor. In some embodiments, the conference call will remain active until, at step 340, the conference call is ended, e.g., by the supervisor device 110 (e.g., the supervisor is finished and hangs up). Once a meeting has been ended, in some embodiments, at step 345, the processor may be configured to remove the meeting contact ID from the team. In some embodiments, the contacts may be removed from ACD memory tracking the team. It should be noted that in some embodiments, when commencing the impromptu voice meeting, the processor may invoke a call from a media provider to the initiator of the request and to each of the available agent devices.

In some embodiments, a media provider my refer to Software and/or Hardware that handles calls and connections between phones and telephony providers.

Figure 7:
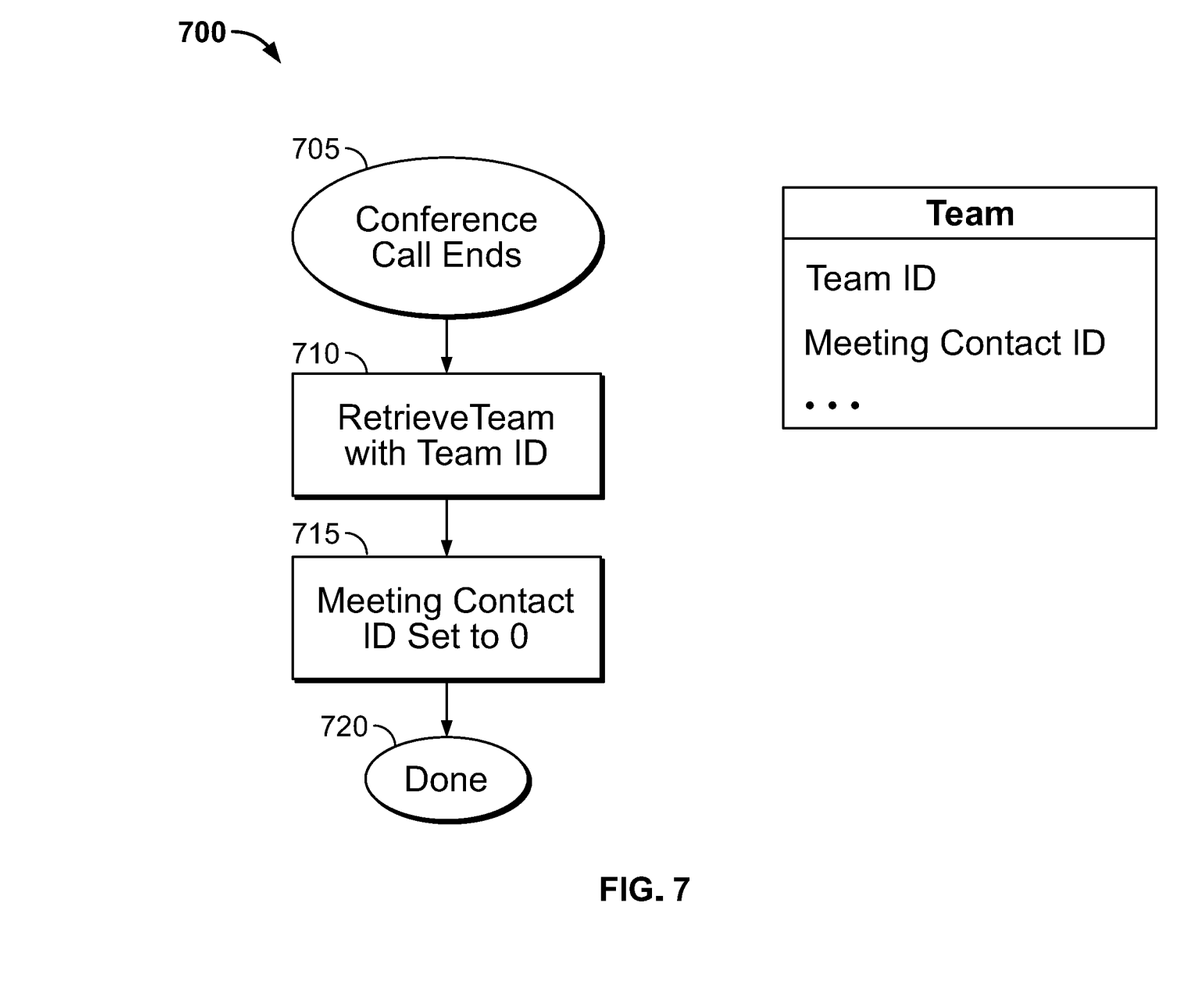
FIG. 7 is a flowchart of a method of closing the conference call according to at least one embodiment of the invention.

Turning briefly to FIG. 7, a flowchart of a method 700 of closing the conference call is shown according to at least one embodiment of the invention. At step 705 the processor may be configured to start the closing process. First, at step 710, the processor may retrieve the team, i.e., the list of agent IDs associated with the team ID that was connected to the meeting. At step 715, in some embodiments, the processor may be configured to set the meeting contact ID to 0 (or other assigned indicator that otherwise disassociates the agent devices 120 from the meeting contact ID.

Figure 8:
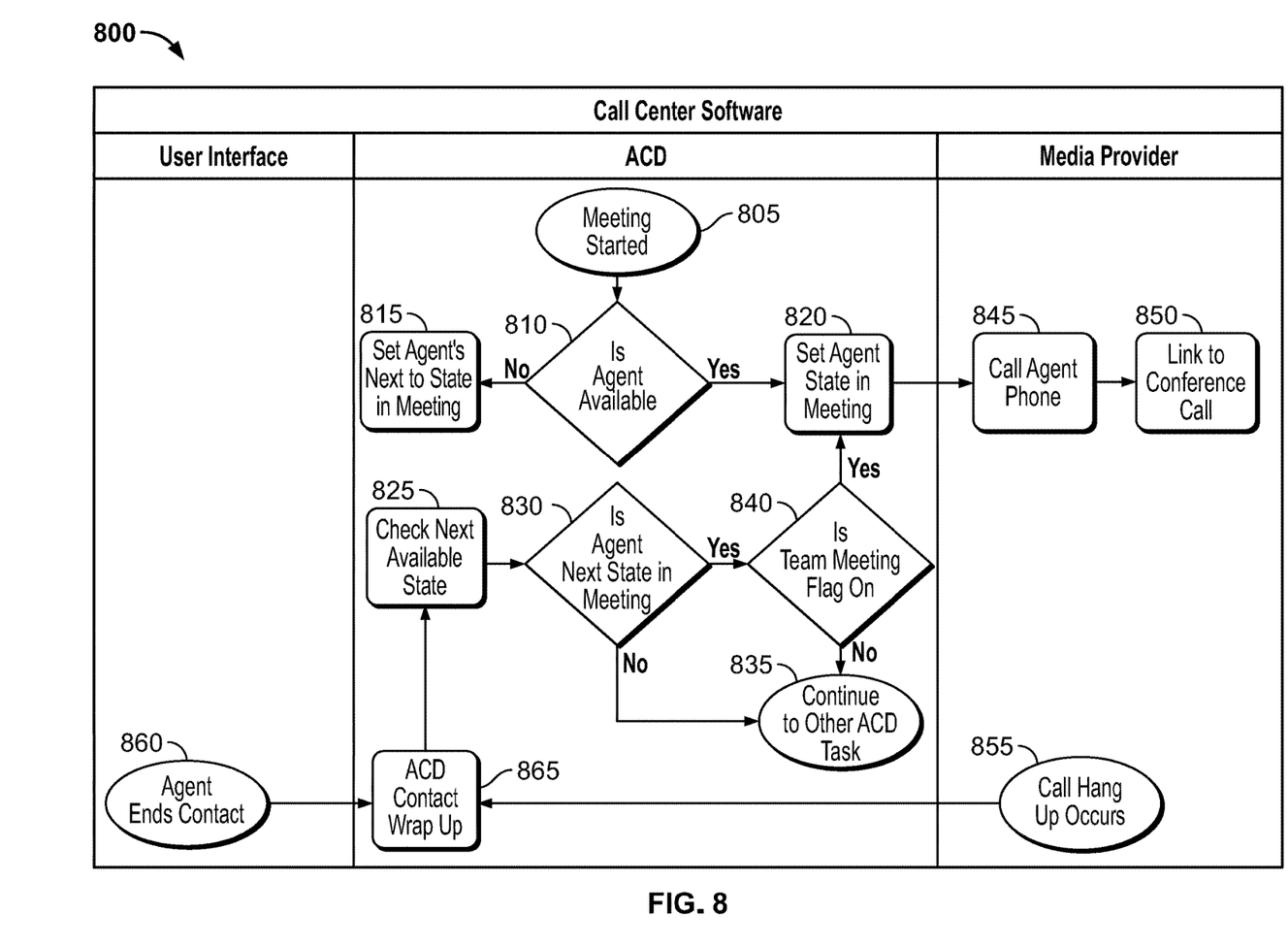
FIG. 8 is a flowchart of a method of connecting available agents to an impromptu meeting according to at least one embodiment of the invention.

Turning to FIG. 8, a flowchart of a method 800 of connecting available agents to an impromptu meeting is shown according to at least one embodiment of the invention. The method starts at step 805 when, a meeting has been initiated by a supervisor and the meeting has commenced, as described in detail herein. At step 810, in some embodiments, the processor may be configured to check the status of each agent device 120 being requested to join the conference call. If an agent device 120 is not available to join the meeting, then, in some embodiments, at step 815 the agent's Next State (i.e., the state that will follow the agent's current state) may be set to "In Meeting" or other equivalent identifier. Alternatively, if the agent is indicated as available then, in some embodiments, at step 820, the agent's current State may be set to "In Meeting" or other equivalent identifier.

In some embodiments, at step 825, the processor may be configured to check the state of agent devices 120 which are to be linked or connected to the conference call. For example, in some embodiments, the processor may be configured to check a Next Available State (i.e., the state when the agent will next be available). If, at step 830, an agent device 120 does not have a Next State of "In Meeting" or an equivalent indicator, then at step 835, the processor may be configured to direct the agent device 120 to continue to another ACD task (e.g., another previously scheduled task, a next caller in a queue, another scheduled meeting, etc.). In some embodiments, every time an Agent goes to close out what state they are in, e.g., working, lunch, unavailable, etc., the system may be configured to check which state they should be in next. Alternatively, if, at step 830, an agent device 120 does have a Next State of "In Meeting" or an equivalent indicator, then, in some embodiments, at step 840, the processor may be configured to check whether or not a team meeting flag or other indicator is on or activated. If, at step 840, the processor determines that a team meeting flag or other indicator is on or activated, then the method may continue to step 820 and set the Agent State to "In Meeting" or an equivalent indicator. Alternatively, if, at step 840, the processor determines that no team meeting flag has been activated, then the method may proceed to step 835. As understood herein, an agent state represents the current activity of the Agent. This includes being available to take calls, various states of unavailability such as being on a call or on a break, etc. The Agent State is used by the ACD in decision making for routing call.

In some embodiments, at step 845, when a given agent's Agent State has been set to "In Meeting," (e.g., at step 820), the ACD system 124 may be configured to call or otherwise contact the agent device 120, e.g., via the Media Provider, and at step 850 the agent device 120 may be linked to the conference call. Upon conclusion of the meeting, at step 855 to the processor may cause the call to disconnect the agent device 120 (e.g., call hang-up occurs). Alternatively, in some embodiments, at step 860, the agent may be provided with a disconnect button on the agent's user interface to end the agent's contact. In either event, once an agent device 120 is disconnected from the impromptu meeting, at step 865 the processor may implement an ACD Contact Wrap Up, and the method may loop back to step 825 and check the next available state.

Figure 9A:
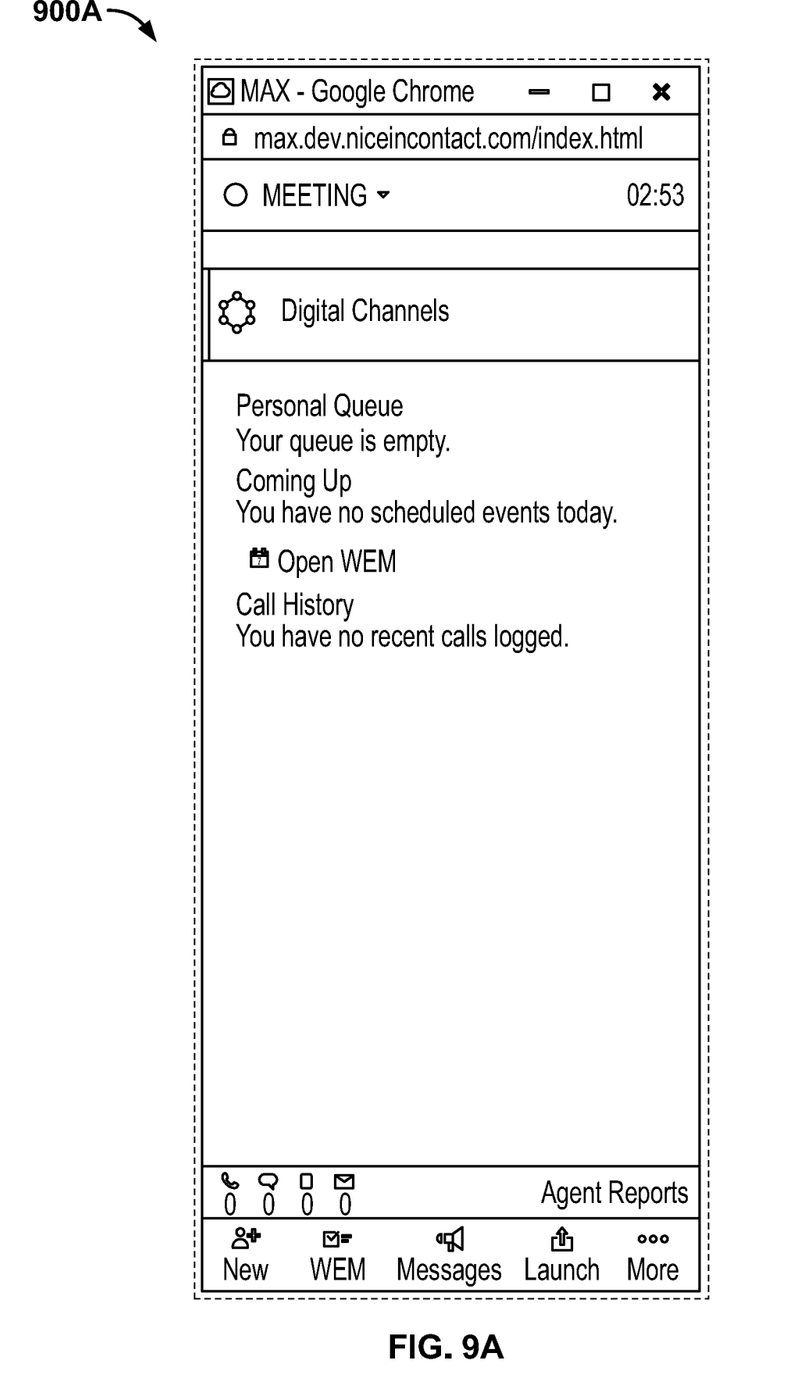
FIGS. 9A and 9B are examples of an agent user interface shown according to various embodiments of the invention.
Figure 9B:
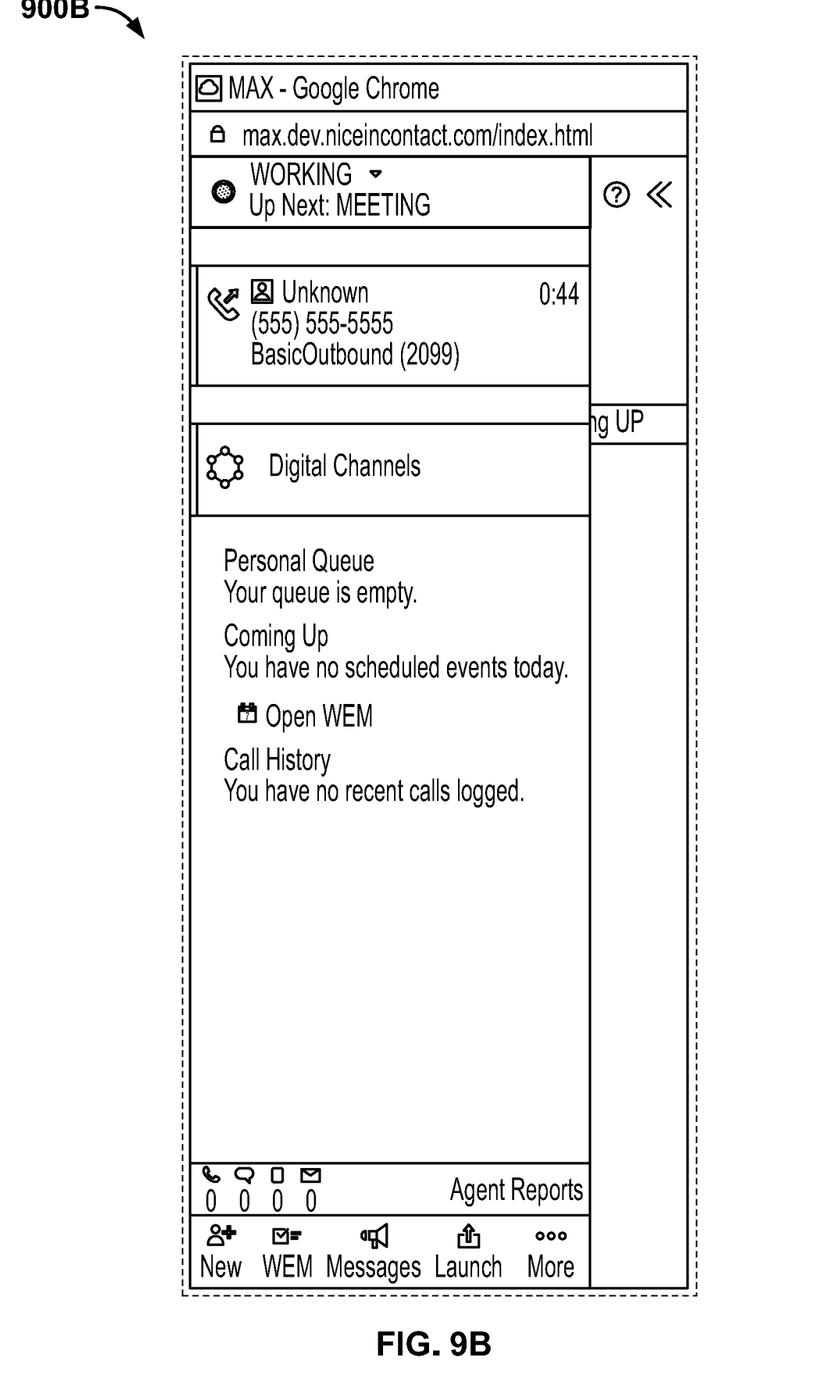

Turning briefly to FIGS. 9A and 9B, an example agent user interface 900 is shown according to various embodiments (900A and 900B) of the invention. FIG. 9A is shown displaying the status "Meeting", which may occur when the agent device 120 have been successfully connected to a meeting by the ACD system 124 automatically. FIG. 9B is shown displaying the up next status of 'MEETING', which may occur when the agent device 120 is currently on a call.

Figure 10:
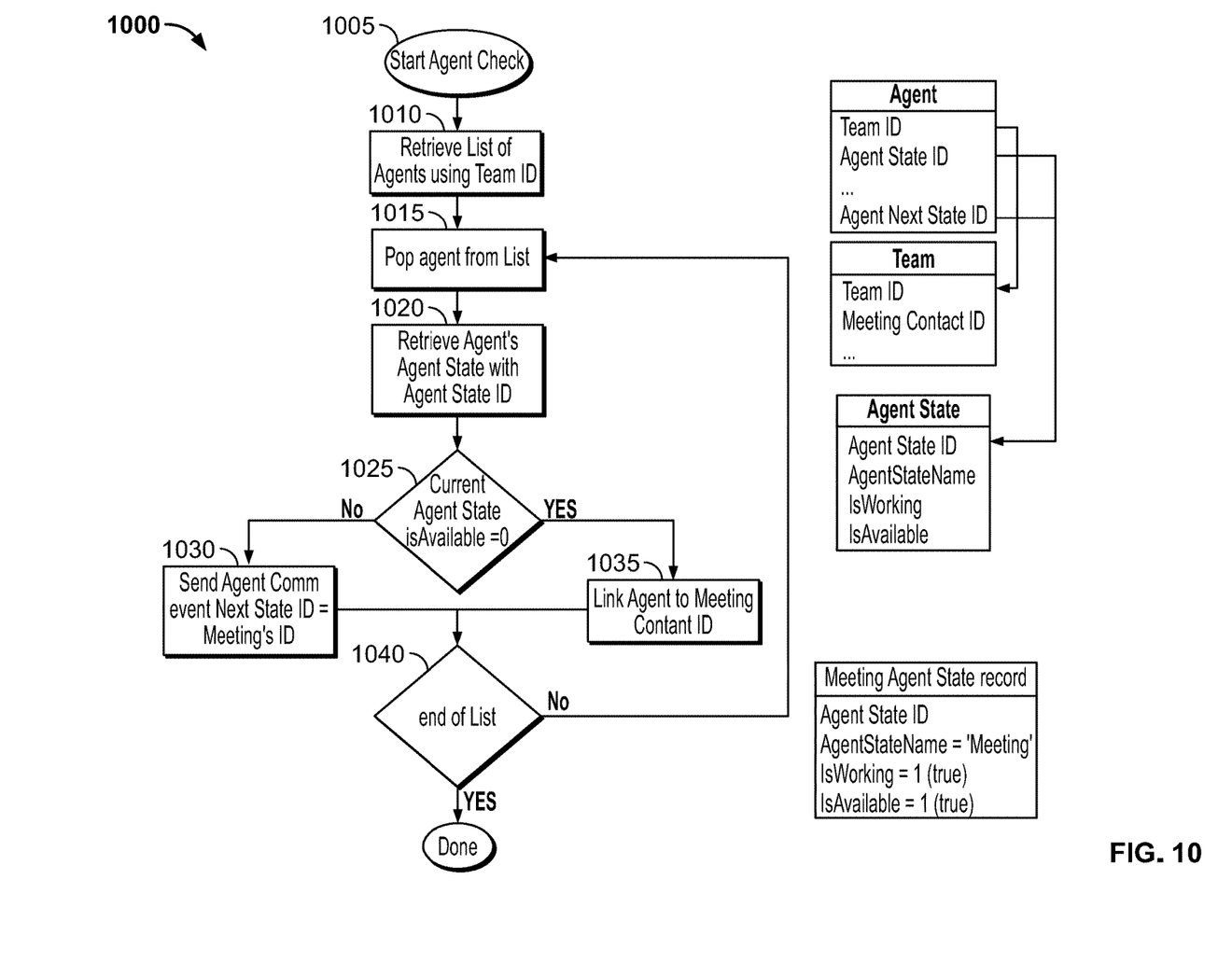
FIG. 10 is a flowchart of a method of setting an availability status of agents to join an impromptu meeting according to at least one embodiment of the invention.

Turning to FIG. 10, a flowchart of a method 1000 of setting an availability status of agents to join an impromptu meeting is shown according to at least one embodiment of the invention. In some embodiments, before a given agent may be added to a call, the agent device 120 must be available. If the agent device is currently in an unavailable state, in some embodiments, the processor is configured to store the next state to be able to pick up the meeting request when the agent becomes available, as described herein.

At step 1005, in some embodiments, the processor may be configured to start an agent status check. Add step 1010, in some embodiments, the processor may be configured to retrieve a list of agents (agent IDs), e.g., using the team ID. At step 1015, the processor may be configured to pop a first agent from the list, using the Agent ID. At step 1020, the processor may be configured to retrieve the specific agent's agent state with the agent state ID. At step 1025, in some embodiments, if the agent state is indicated as available (e.g., 'isAvailable' set to zero), then, at step 1030, the processor may link the respective state of the available agent device 120 among the team of agent devices, to the meeting contact ID. Alternatively, if the agent state is indicated unavailable (e.g., 'isAvailable' is not set to zero), then, at step 1030, the processor may send an instruction to set the agent's next state ID to the meeting contact ID (e.g., send AgentComm event Next State ID=meeting contact ID). At step 1035, if the end of the list of agents has not yet been reached, then, in some embodiments, the processor may be configured to pop a next agent (e.g., agent ID) from the list at step 1015 and the method continues. Alternatively, if, at step 1040, the end of the list of agents has been reached, then the method ends.

Figure 11:
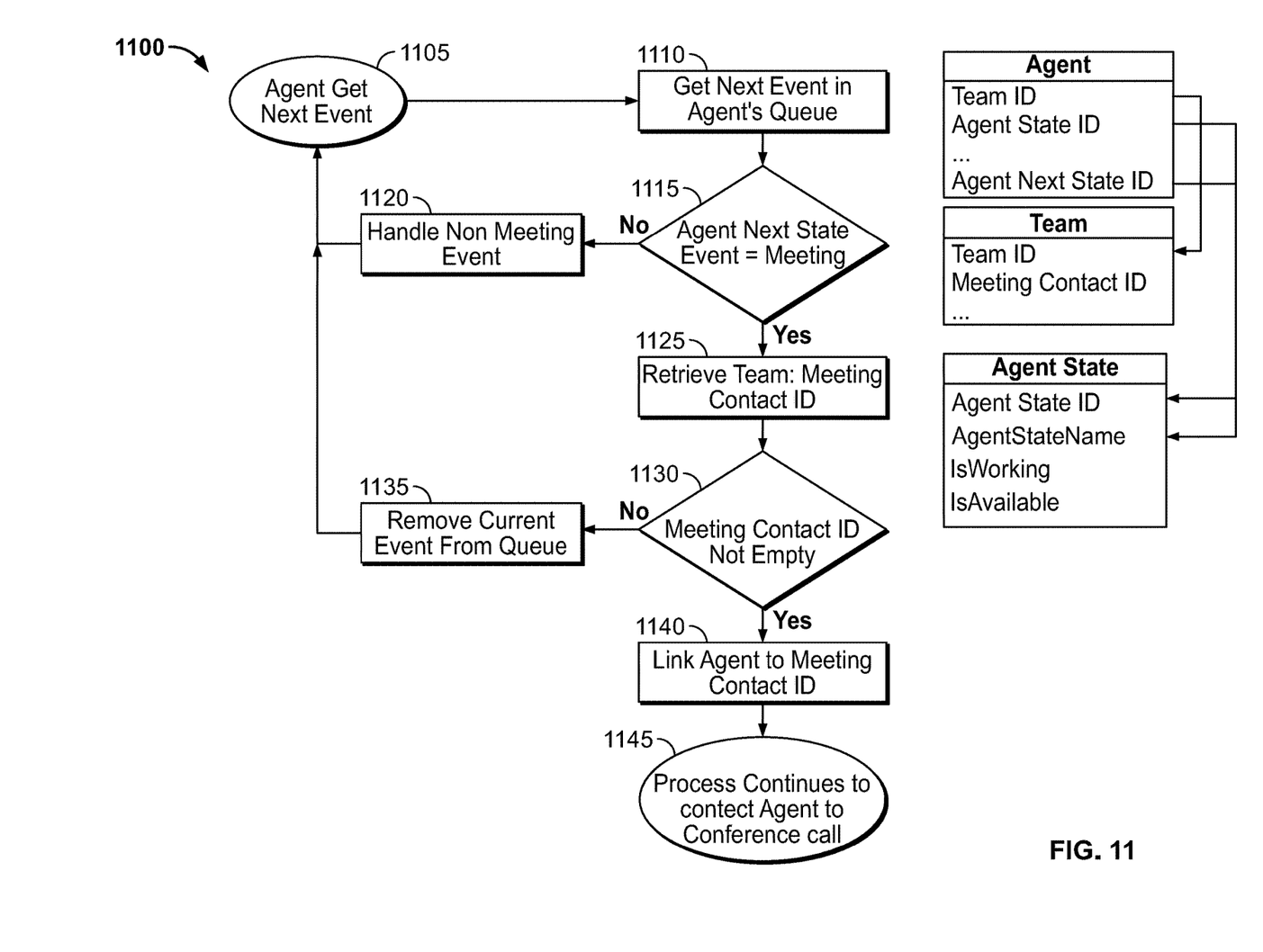
FIG. 11 is a flowchart of a method of handling a queued event to join a meeting according to at least one embodiment of the invention.

Turning to FIG. 11, a flowchart of a method 1100 of handling a queued event to join a meeting is shown according to at least one embodiment of the invention. in some embodiments, events are given to the agent by the ACD system 124 sequentially. Accordingly, in some embodiments, the processor may be configured to loop through queued events until the supervisor's meeting event is found, at which point processor can act on it if the meeting is in progress or can remove the event from the queue if the meeting has ended before the agent was available.

At step 1105, in some embodiments, the agent device 120 may be configured to receive or get a next event. In some embodiments, at step 1110, the processor may be configured to retrieve, get, or otherwise check, for a given agent, the Next Event in the agent's queue. At step 1115, in some embodiments, if the agent's Next State is not set to 'Meeting' (e.g., the agent is set to connect another non-meeting event), then at step 1120 the processor may handle the non-meeting event, and then return to step 1105. Alternatively, if the agent's Next State is set to 'Meeting' (e.g., the agent is set to connect to the impromptu meeting), then at step 1125 the processor may be configured to retrieve the team meeting contact ID. At step 1130, the processor may be configured to check whether or not the meeting contact ID is empty. If the retrieved meeting contact ID is, e.g., empty or set to zero (for example, if the meeting has concluded) then at step 1135 the processor may be configured to remove the current event from the queue and return to step 1105. Alternatively, if, at step 1130, the retrieved meeting contact ID is not empty (e.g., the meeting is still ongoing and therefore the retrieved meeting contact ID is provided), then at step 1140, in some embodiments, the processor may be configured to link the agent (e.g., agent device 120) to the meeting contact ID. Finally, once linked, at step 1145 the processor may connect the agent to the impromptu meeting (e.g., the conference call).

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Computer database, systems integration, and scheduling technology may be improved by shortening the time taken to identify a person, retrieve records related to the person, and schedule a meeting with the person.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method for coordinating an impromptu voice meeting in an automated call distribution (ACD) system, comprising:
    receiving, by a processor, a request to initiate the impromptu voice meeting among a team of agent devices;
    validating, by the processor, the request to initiate the impromptu voice meeting;
    generating, by the processor, a meeting contact identifier, the meeting contact identifier having a current state at the time of generating and a next state that follows the current state;
    commencing, by the processor, the impromptu voice meeting between an initiator of the request and each of the agent devices that is available;
    linking, by the processor, a respective state of the initiator of the request and each available agent device among the team of agent devices, to the meeting contact identifier;
    setting by the processor, a respective state of each unavailable agent device among the team of agent devices to the next state of the meeting contact identifier; and
    while the impromptu voice meeting is active, adding, by the processor, each respective previously unavailable device to the impromptu voice meeting as it becomes available.

2. The method as in claim 1, wherein the request is sent based on an interaction with a user interface of a supervisor device initiating the request.

3. The method as in claim 1, wherein the request comprises a security token and a team identifier.

4. The method as in claim 3, wherein validating the request comprises:
    authenticating, by the processor, the security token of the requestor;
    confirming, by the processor, that the requestor has sufficient permission to initiate the impromptu voice meeting; and
    verifying, by the processor, that the team identifier exists and is active.

5. The method as in claim 1, wherein commencing the impromptu voice meeting comprising:
    invoking, by the processor, a call from a media provider to the initiator of the request
    and to each of the available agent devices.

6. The method as in claim 1, further comprising:
    activating, by the processor, a flag identifier for each team member upon validation of the request, wherein the flag identifier indicates that a meeting has been initiated; and
    deactivating, by the processor, the flag identifier for all team members when the meeting has been terminated.

7. The method as in claim 1, wherein adding, by the processor, each respective unavailable device to the impromptu voice meeting as it becomes available comprises:
    invoking, by the processor, a call from the media provider to each respective previously unavailable device as it becomes available; and
    linking, by the processor, a respective state of each respective previously unavailable device to the meeting contact identifier.

8. A system for coordinating an impromptu voice meeting in an automated call distribution (ACD) system, comprising:
    a server having a processor and memory; and
    one or more code sets stored in the memory and executing in the processor which, when executed, configure the processor to:
        receive a request to initiate the impromptu voice meeting among a team of agent devices;
        validate the request to initiate the impromptu voice meeting;
        generate a meeting contact identifier, the meeting contact identifier having a current state at the time of generating and a next state that follows the current state;
        commence the impromptu voice meeting between an initiator of the request and each of the agent devices that is available;

link a respective state of the initiator of the request and each available agent device among the team of agent devices, to the meeting contact identifier;

set a respective state of each unavailable agent device among the team of agent devices to the next state of the meeting contact identifier; and while the impromptu voice meeting is active, add each respective previously unavailable device to the impromptu voice meeting as it becomes available.

9. The system as in claim 8, wherein the request is sent based on an interaction with a user interface of a supervisor device initiating the request.

10. The system as in claim 8, wherein the request comprises a security token and a team identifier.

11. The system as in claim 10, wherein, when validating the request, the processor is further configured to:
    authenticate the security token of the requestor;
    confirm that the requestor has sufficient permission to initiate the impromptu voice meeting; and
    verify that the team identifier exists and is active.

12. The system as in claim 8, wherein, when commencing the impromptu voice meeting, the processor is further configured to:
    Invoke a call from a media provider to the initiator of the request and to each of the available agent devices.

13. The system as in claim 8, further configured to:
    activate a flag identifier for each team member upon validation of the request, wherein the flag identifier indicates that a meeting has been initiated; and
    deactivate the flag identifier for all team members when the meeting has been terminated.

14. The system as in claim 8, wherein, when adding each respective unavailable device to the impromptu voice meeting as it becomes available, the processor is further configured to:
    invoke a call from the media provider to each respective previously unavailable device as it becomes available; and
    link a respective state of each respective previously unavailable device to the meeting contact identifier.

15. A method for coordinating an impromptu voice meeting in an automated call distribution (ACD) system, comprising:
    receiving, by a processor, a request to initiate the impromptu voice meeting among a group of user devices;
    validating, by the processor, the request to initiate the impromptu voice meeting;
    generating, by the processor, a meeting contact identifier, the meeting contact identifier having a current state at the time of generating and a next state that follows the current state;
    commencing, by the processor, the impromptu voice meeting between an initiator of the request and each of the user devices that is available;
    linking, by the processor, a respective state of the initiator of the request and each available user device among the group of user devices, to the meeting contact identifier;
    setting by the processor, a respective state of each unavailable user device among the group of user devices to the next state of the meeting contact identifier; and
    while the impromptu voice meeting is active, adding, by the processor, each respective previously unavailable user device to the impromptu voice meeting as it becomes available.

16. The method as in claim 15, wherein the request is sent based on an interaction with a user interface of a supervisor device initiating the request.

17. The method as in claim 15, wherein the request comprises a security token and a group identifier.

18. The method as in claim 17, wherein validating the request comprises:
    authenticating, by the processor, the security token of the requestor;
    confirming, by the processor, that the requestor has sufficient permission to initiate the impromptu voice meeting; and
    verifying, by the processor, that the group identifier exists and is active.

19. The method as in claim 15, wherein commencing the impromptu voice meeting comprising:
    invoking, by the processor, a call from a media provider to the initiator of the request and to each of the available user devices.

20. The method as in claim 15, further comprising:
    activating, by the processor, a flag identifier for each group member upon validation of the request, wherein the flag identifier indicates that a meeting has been initiated; and
    deactivating, by the processor, the flag identifier for all group members when the meeting has been terminated.

21. The method as in claim 15, wherein adding, by the processor, each respective unavailable device to the impromptu voice meeting as it becomes available comprises:
    invoking, by the processor, a call from the media provider to each respective previously unavailable user device as it becomes available; and
    linking, by the processor, a respective state of each respective previously unavailable user device to the meeting contact identifier.

* * * * *